Dec. 12, 1967     T. BOWLING     3,358,121

INTEGRATED OVEN CONTROLS

Filed July 21, 1965

INVENTOR.
TEAMUS BOWLING
BY Richard L. Caslin
HIS ATTORNEY

3,358,121
INTEGRATED OVEN CONTROLS
Teamus Bowling, Fern Creek, Ky., assignor to General Electric Company, a corporation of New York
Filed July 21, 1965, Ser. No. 473,627
7 Claims. (Cl. 219—412)

The present invention relates to electric heating systems for ovens, or the like, and particularly to combination manually-controlled and timer-controlled switching mechanisms for such ovens.

The oven of an electric range ordinarily comprises three types of manual controls for the resistance heating elements; namely, a circuit selector switch, an oven thermostat and a timer control for use during a timed baking operation. In the past, means have been devised for combining the selector switch and the thermostat in a single device having a single manual control knob and shaft. Moreover, the prior art includes examples of a combined selector switch, thermostat and timer with complex mechanisms for automatically resetting the control to a manual control once the timed baking cycle has been completed and the heating elements de-energized. The present invention relates to an oven control system that is intermediate the first entirely manual system and the second automatic resetting system as will be better understood hereinafter.

Modern electric oven timers often include means for setting the "Start" time, i.e., the time at which the oven is to be turned on, and means for setting the "Stop" time, i.e., the time at which the oven is to be turned off. In using such a timer, the housewife may set her oven for automatic operation by adjusting her timer to the desired setting. The timing mechanism then energizes the oven heating elements when the "Start" time is reached, and de-energizes them when the "Stop" time is reached.

On occasion the housewife may desire to manually control the operation of her oven rather than controlling it automatically. For "Manual" operation it is necessary that the timer controlled switch be in a closed circuit position. With the timer switch set for "Manual" operation the housewife may then control the oven by means of the oven selector switch and oven thermosat. An example of a typical oven timer is shown in the Zagorski Patent No. 3,038,041 which was issued on June 5, 1962 and is assigned to the General Electric Company, the assignee of the present invention.

The principal object of the present invention is to provide an integrated oven control comprising a combination of circuit selector switch, oven thermostat and timer with a simplified timer switch means that is partially controlled by the operation of the selector switch.

A further object of the present invention is to provide an oven timer design with a simplified timer switch means capable of four positions of operation.

A further object of the present invention is to combine the oven selector switch with the oven thermostat in a single control means, and to unite this with an oven timer having an automatic latching means for the timing mechanism, where the latching means is controlled by the setting of the circuit selector switch in the "Off" position.

The present invention, in accordance with one form thereof, is embodied in a control system for controlling a heating circuit from a source of electric power and including a circuit selector switch, an oven thermostat and an improved timer having a timer switch means with an open circuited "Set" position, a closed circuit timed "Start" position, an open circuited timed "Stop" position and a closed circuit "Normal Heating" position. There is also means controlled by the manual setting of the circuit selector switch in the "Off" position for arranging the timer switch means into the "Normal Heating" position.

My invention will be better understood from the following description taken in conjunction with the accompanying drawing and its scope will be pointed out in the appended claims.

Figure 1:
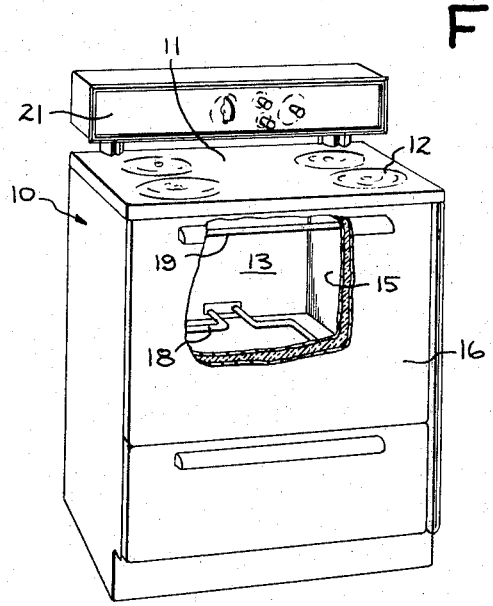
FIGURE 1 is a perspective view of a free-standing electric range having an oven with integrated oven controls embodying the present invention.

Turning now to a consideration of the drawing and in particular to FIGURE 1, there is shown for illustrative purposes an electric range 10 having a top cooking surface or cooktop 11 with a plurality of surface heating elements 12, and an oven 13 located beneath the cooktop 11 for performing both baking, broiling and timed baking operations. The oven has inner walls forming an oven cavity, and these walls are formed by a box-like oven liner 15 which has a front opening that is adapted to be closed by a hinged door 16. As is standard in this art, the oven is provided with a pair of electric resistance heating elements; namely, a lower bake element 18 and an upper broiling element 19.

The controls for both the surface heating elements 12 and the oven heating elements 18 and 19 are assembled in a control panel or backsplash 21 that is located at the back of the cooktop 11. Only the oven controls are illustrated in the backsplash but it will be understood by those skilled in the art that each surface heating element 12 would also include at least a circuit selector switch, and in some cases an automatic temperature control means.

Figure 2:
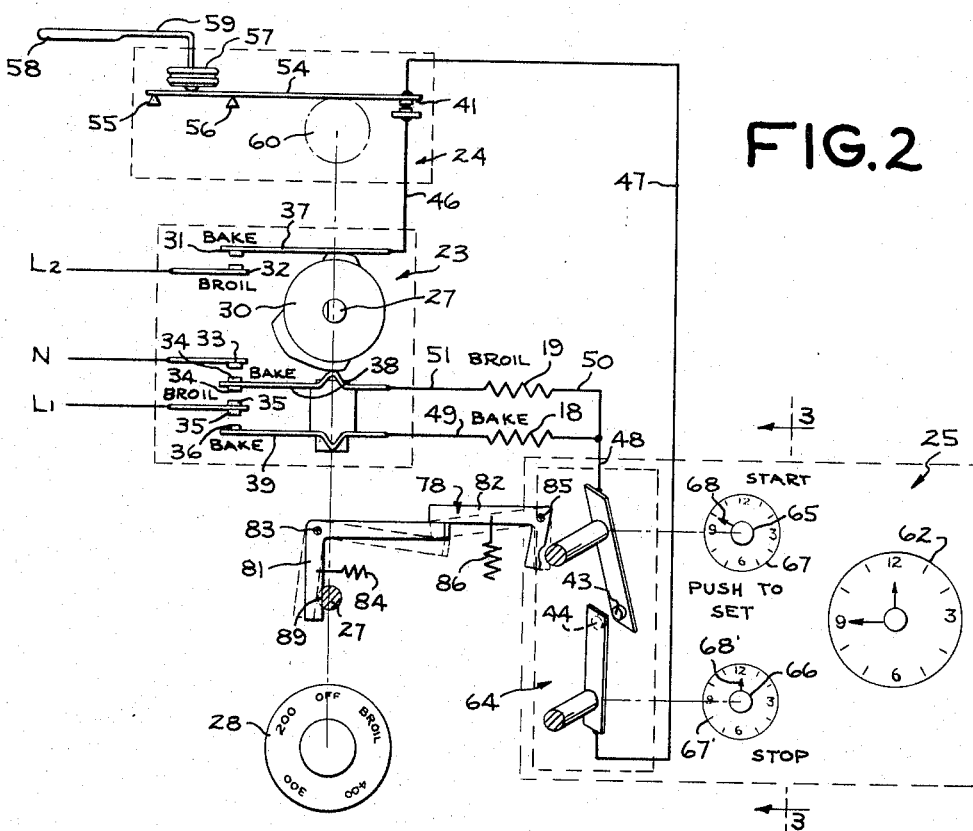
FIGURE 2 is a combined electrical and mechanical diagram of an electric heating system for the oven shown in FIGURE 1.

The integrated control system of the present invention comprises three main elements that are best seen in FIGURE 2; namely, an oven selector switch 23, an oven thermostat 24, and an oven timer 25. In the preferred embodiment of the present invention the circuit selector switch 23 is combined with the oven thermostat 24 in a single device so as to have a single operating shaft 27 with a single control knob 28. The knob 28 would include indicia marked thereon such as an "Off" position, a plurality of heating positions with temperatures ranging from about 150° F. to 550° F. as well as a "Broil" position at the high end of the temperature range. Such a combined device may be obtained by extending the shaft of a standard hydraulic thermostat and placing over the shaft a selector switch comprising a housing that supports a switch cam 30, a plurality of switch contacts 31–36 and a plurality of spring blades 37–39. The contacts 31, 34 and 36 are all movable contacts each supported on a cantilever spring blade 37, 38 and 39 respectively, while the remaining contacts 32, 33 and 35 are all fixed contacts. Notice that there is an insulating bridging member 40 joining the two spring blades 38 and 39 so that these blades are caused to move in unison due to the bearing action of the cam 30. The closed contact positions have each been labelled with the alternate circuit arrangements, "Bake" and "Broil."

The oven thermostat 24 is illustrated diagrammatically as a hydraulic thermostat of the general type taught in the Ettinger Patent No. 2,260,014, which is assigned to the General Electric Company the assignee of the present invention. Its main elements are a snap-acting spring blade 54 supported by a pair of spaced fulcrums 55 and 56 and acted upon by a bellows or diaphragm 57 that is part of a hydraulic system that includes a temperature sensing probe or bulb 58 that is connected to the bellows by a capillary tube 59. Also, there is a temperature adjustment means usually associated with the bellows 58 but shown here diagrammatically as merely a cam 60 that is operated from the shaft 27 of the combined selector switch 23 and thermostat 24. The thermostat 24 includes a switch 41 that is a normally closed switch that is adapted to be opened when the temperature rises to the critical temperature set by the control knob 28 thereby causing the hydraulic fluid to expand and the bellows to enlarge. This exerts an increased force on the spring blade 54 and flexes the blade for obtaining a snap action of the switch contacts 41 to open the power circuit to the heating elements 18 and 19.

As is standard in this art, the electric oven 13 is provided with an electric power supply of three-wire Edison type of 236 volts, single phase, A.C. and includes two ungrounded line conductors L1 and L2, and a grounded neutral conductor N. The circuit selector switch 23 has in fact three positions; namely, an "Off" position that is illustrated in FIGURE 2 where all of the switch contacts are open. The second switch position is a "Bake" position with the bake element 18 connected across lines L1 and L2 at 236 volts, while the broil element 19 is connected across L2 and neutral N at 118 volts. The third switch position is a "Broil" position where the broil element 19 is connected across lines L1 and L2 at 236 volts. The oven timer 25 also has a single pole switch with switch contacts 43 and 44 mounted on spring blades 74 and 75 respectively and connected in series with the thermostat switch 41 and the heating elements 18 and 19.

The bake circuit may be traced as follows closing contacts 31, 32, 35 and 36 from line L2 through the selector switch 23 by means of switch contacts 32 and 31, and spring blade 37, then by lead 46 to the oven thermostat 24 and through the thermostat switch 41, and then by lead 47 to the oven timer 25 and through the timer contacts 43, 44 and then by lead 48 through the bake element 18, then by lead 49 back to the circuit selector switch 23, and through the spring blade 39 and switch contacts 36 and 35 to line L1. As to the broil element 19, during the baking operation, it is in a circuit that closes switch contacts 31, 32, 33 and 34 and may be traced from line L2 through switch contacts 32 and 31, blade 37, lead 46 through the thermostat contacts 41 and lead 47, through the timer contacts 43 and 44 and by leads 48 and 50 through the broil element 19, then by lead 51 back to the selector switch 23 and through spring blade 38 and switch contacts 34 and 33 to neutral conductor N.

Considering the broil circuit, the broil element 19 is connected across lines L1 and L2 at 236 volts and the bake element 18 is de-energized. This is accomplished by the selector switch 23 having the spring blade 37 closing contacts 31 and 32 while the spring blade 38 closes contacts 34 and 35 as is labelled in FIGURE 2.

The oven timer 25 is not shown in complete detail, but it is of the general type taught in the Zagorski Patent No. 3,038,041 as was mentioned previously. Such a timer has a face plate supporting an electric clock mechanism 62 having an electric motor (not shown) and a train of driving and driven gears in conjunction with a timer switch having contacts 43 and 44 and identified as elements 64 in FIGURE 3. Timer starting and stopping control members 65 and 66 respectively are also provided, and these members function as switch actuators of similar design and operation for controlling the time of response of the timer switch 64 to the timer mechanism 25. Each actuator is supplied with a clock face 67, 67' and pointer or clock hand 68, 68' for ease in setting the proper "Start" and "Stop" time for the timed baking cycle. Each timer actuator 65 and 66 includes a knob 69, 69' and shaft 70, 70' that extends loosely through a motor driven gear 71, 71' while carrying a second gear 72, 72'. A compression spring 73, 73' encircles the shaft 70, 70' and bears between the housing of the timer switch 64 and the gear 72, 72' so as to normally bias the shaft 70, 70' in an outward direction. Notice that the end of each shaft 70, 70' bears against a spring blade 74 or 75 of the timer switch 64 for the manipulation thereof. Each of the driven gears 71, 71' carries a short indexing pin 76, 76' on its back side for mating engagement with a small hole (not shown) in the gear 72, 72' carried by the shaft 70, 70'. When the spring 73, 73' is compressed the gear 72, 72' is withdrawn from the pin 76, 76' thus permitting the shaft 70, 70' to be turned to the proper angular or time setting. The driving gear 71, 71' turns continuously since it is part of an electric clock mechanism and in so doing the pin 76, 76' will eventually be brought to register with the hole (not shown) in the driven gear 72, 72' thereby allowing the gear 72, 72' to be slipped onto the pin 76, 76' and actuating the timer switch 64. Hence, in order to set either the "Start" or the "Stop" actuator 65 or 66 it is necessary to push the particular actuator 65 or 66 respectively so as to compress the spring 73, 73' and withdraw the gear 72, 72' from mating engagement with a pin 76, 76' carried by the driven gear 71, 71'. Once the gear 72, 72' is free of the pin 76, 76' it is then possible to turn the shaft 70, 70' to obtain the proper angular orientation of the hand or pointer 68 of the clock face.

Figure 3:
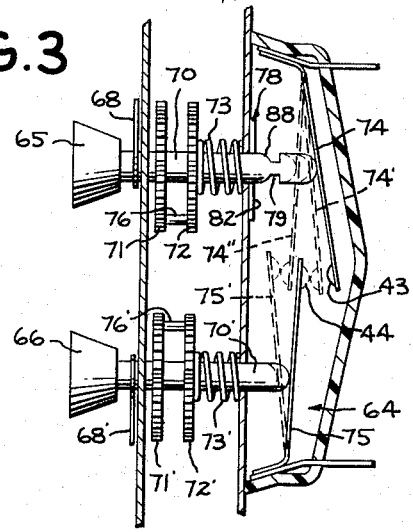
FIGURE 3 is a cross-sectional elevational view through the oven timer taken on the line 3—3 of FIGURE 2 and showing the nature of the timer switch and its interrelation with both the "Start" and "Stop" actuators of the timer.

The timer switch 64 is a single pole, four position switch and it is illustrated in FIGURE 3 in its first, open circuited "Set" position where the switch contacts 43 and 44 are separated from each other. This is accomplished by setting both the "Start" indicator 65 and the "Stop" indicator 66 by first pressing each one inwardly and then turning the pointer 68, 68' to the desired timed position.

The second position of the timer switch 64 is a timed closed circuit "Start" position when the pin 76 of the driving gear 71 aligns with the opening in the gear 72 thereby allowing the spring 73 to bias the gear 72 in an outward or left direction from that shown in FIGURE 3. However, the shaft 70 does not move to its extreme outward position, but it is retained in an intermediate position by an automatic spring biased latching means 78 cooperating with an annular groove 79 in the shaft 70 thereby allowing the spring blade 74 to deflect to a second position 74' and engage the contact 43 with the contacts 44. This automatic latching means 78 comprises a pair of pivoted pawls 81 and 82 as is best seen in FIGURE 2. Element 81 is identified as a release pawl that is of generally L-shape and pivoted adjacent its center by pin 83 and biased by tension spring 84 to turn in a counterclockwise direction so as to have one end bearing against the side of the shaft 27 of the selector switch 23. The second pawl 82 is identified as a retaining pawl of similar L-shape that is pivoted about pin 85 and has one end normally in engagement with the shaft 70 of the "Start" actuator 65 due to the bias of a tension spring 86. The opposite end of the retaining pawl 82 is likewise biased to be in engagement with the nearest end of the release pawl 81. Notice that the annular groove 79 has a tapered surface 88 bordering the annular groove 79 as this makes it possible to depress the shaft 70 to its extreme inner position without being retarded by the automatic latching means 78. However, the reverse motion is not possible since the automatic latching means 78 will capture the shaft 70 in an intermediate position when the timer starts the heating cycle as the pin 76 of the gear 71 mates with its hole in the gear 72 and the contacts 43 and 44 close for the first time in the cycle.

The third position of the timer switch 64 is a timed open circuited "Stop" position caused by the pin 76' of the timer gear 71' mating with a hole (not shown) in the gear 72', thereby allowing the shaft 70' to be forced to its outward or left-hand position in FIGURE 3 and permitting the switch blade 75 to drop away from blade position 74' and move into blade position 75' withdrawing the contact 44 from engagement with the contact 43. The fourth and final position of the timer switch 64 is a closed circuit "Normal Baking" position that is arranged by the housewife turning the control knob 28 of the selector switch to the "Off" position. Notice in FIGURE 2 that the shaft 27 of the selector switch has a flattened side as at 89 thereby allowing the release pawl 81 to move in a slight counter-clockwise direction thereby raising the end of the retaining pawl 82 and at the same time disengaging the pawl 82 from the annular slot 79. When the retaining pawl 82 disengages the shaft 70, the shaft is allowed to move to its extreme outward or lefthand position and this backs the shaft 70 away from the blade position 74' until the blade assumes position 74" where the switch contacts 43 and 44 are closed for the second time as is shown in dotted lines in FIGURE 3.

Modifications of this invention will occur to those skilled in this art; therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A control device for controlling a heating circuit from a source of electric power, the combination comprising a combined selector switch and thermostat operable between on "Off" position and a plurality of heating positions for controlling the heating circuit, a timer having timer switch means with at least a "Set" position, a timed "Start" position, a timed "Stop" position and a "Normal Heating" position for connecting said thermostat to a source of electric power, and automatic latching means between the selector switch and the said timer switch means for temporarily holding the switch means in both its "Start" and "Stop" positions and being releasable for setting the switch means into the "Normal Heating" position when the selector switch is set in its "Off" position.

2. An electric heating system for an oven or the like comprising a source of electric power, electric heating elements operatively associated with said oven, a combined circuit selector switch and thermostat operable between an "Off" position and a plurality of heating positions for controlling the heating elements, a timer including timer switch means with a "Set" position, a timed "Start" position, a timed "Stop" position and a "Normal Baking" position, the said "Set" position being established by manually selecting both the "Start" time and the "Stop" time, both the timed "Start" position and the timed "Stop" position being obtained by the timer, and means controlled by the combined selector switch and thermostat when in the "Off" position for setting the said timer switch means to the "Normal Baking" position.

3. A control for electric ovens comprising a timer, a thermostat and a circuit selector switch adapted to connect electric heating means to a source of electric power, said selector switch and thermostat being operable between an "Off" position and a plurality of heating positions for controlling the heating means, the timer including a four position, timer switch means with both a "Start" actuator and a "Stop" actuator, the said timer switch means having a first open circuited "Set" position arranged by setting both the "Start" and "Stop" actuators, a second closed circuit "Start" position arranged by the timer, a third open circuited "Stop" position also arranged by the timer, and means controlled by the selector switch when set in the "Off" position for arranging a fourth closed circuited "Normal Baking" position.

4. A control as recited in claim 3 wherein the said timer switch means is a single pole, four position switch formed by a pair of cooperating cantilever spring blades each having a mating contact carried on the distal end thereof.

5. A heating arrangement comprising a space to be heated, heating means for such space, a source of electric power, a timer having a "Start" actuator and a "Stop" actuator, a thermostat responsive to temperature in saia space and controlling the electric power supplied to said heating means, and a circuit selector switch means for arranging various heating circuits such as a "Normal Baking" circuit and a "Timed Baking" circuit utilizing the said timer, said thermostat and selector switch having an "Off" position and a plurality of heating positions, the timer including a four position timer switch means having a first open circuited "Set" position arranged by setting both the "Start" and "Stop" indicators, a second closed circuited "Start" position arranged by the timer, a third open circuited "Stop" position also arranged by the timer, and a fourth closed circuited "Normal Baking" position, and manual settable means controlled by the selector switch when in the "Off" position for arranging the said timer switch means in the "Normal Baking" position.

6. An electric heating system for an oven or the like comprising an oven having electric heating elements operatively associated therewith and adapted to be connected to a source of electric power, a combined circuit selector switch and oven thermostat having a single shaft that is operable between an "Off" position and a plurality of heating positions for controlling the heating circuits, a timer including a "Start" actuator and a "Stop" actuator and a four position timer switch means, each of said actuators including a spring-biased shaft means for manipulating the said timer switch means, the switch means having a first open circuited "Set" position arranged by setting both the "Start" and "Stop" actuator, a second closed circuit "Start" position arranged by the timer, a third open circuited "Stop" position also arranged by the timer, and automatic latching means for the said timer switch means for engagement with one of the said actuator shafts in an intermediate position, said latching means also being associated with the shaft of the combined selector switch and thermostat, whereby the said latching means is released when the shaft of the selector switch is set in its "Off" position, and a fourth closed circuit "Normal Baking" position arranged by the completion of the timed heating cycle and the release of the automatic latching means.

7. An electric heating system as recited in claim 6 wherein the said four position timer switch means comprises a switch housing associated with the said "Start" and "Stop" actuators of the timer, and a pair of cooperating cantilever spring blades each having a mating electrical contact carried on the distal end thereof.

References Cited

UNITED STATES PATENTS

| | | | |
|---|---|---|---|
| 2,935,591 | 5/1960 | Lee | 219—413 X |
| 2,993,975 | 7/1961 | Beal | 219—492 |
| 3,304,405 | 2/1967 | Schauer | 219—396 |

RICHARD M. WOOD, *Primary Examiner.*

C. ALBRITTON, *Assistant Examiner.*